March 28, 1967 W. W. BLAKELY 3,311,351
SHOCK ABSORBING DEVICE
Filed Feb. 2, 1966

TO SUBMERGED
BODY

INVENTOR.
WILLIAM W. BLAKELY
BY
Q. Baxter Warrior
ATTORNEY

United States Patent Office 3,311,351
Patented Mar. 28, 1967

3,311,351
SHOCK ABSORBING DEVICE
William W. Blakely, Thousand Oaks, Calif., assignor, by mesne assignments, to the United States of America as represented by the Secretary of the Navy
Filed Feb. 2, 1966, Ser. No. 524,976
7 Claims. (Cl. 254—172)

The invention described herein may be manufactured and used by or for the Government of the United States of America for governmental purposes without the payment of any royalties thereon or therefor.

This invention relates to devices for absorbing sudden shocks and strains and is particularly adapted to absorbing unusual loads imposed on cables.

Heretofore various resilient or yielding arrangements have been proposed wherein cables interconnecting bodies are maintained taut despite relative movement of the bodies toward or away from each other. However difficulties have been encountered with such arrangements in that under service conditions they frequently prove to be unable to maintain cable tension. One such condition is at sea when one end of a cable is connected to a body bobbing on the ocean surface and the other end is affixed to a suspended load or to an anchor on the ocean floor. It will be apparent that too much cable tension will draw the surface borne body below the surface or snap the cable, and too little tension will allow the surface body to drift.

It is therefore an object of this invention to provide a firm yet resilient means for maintaining tension upon a cable.

Another object is to provide such means with an adjustable control for varying the degree of tension maintained upon the cable.

Still another object is to provide a simple, lightweight and rugged means for absorbing shock loads on a cable without loss of control over cable tension.

Other objects, advantages and novel features of the invention will become apparent from the following detailed description of the invention when considered in conjunction with the accompanying drawing wherein.

Figure 1:
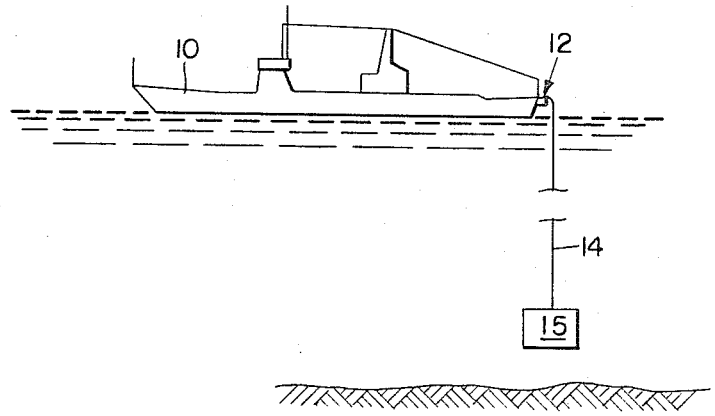
FIG. 1 is a simple diagrammatic view showing the invention in use in an ocean environment.

Referring now to the drawings wherein like numbers designate like parts, FIG. 1 discloses a vessel 10 floating on the surface of a body of water. At the after end of the vessel is located the cable tensioning device 12 illustrated in detail in FIG. 2. Depending from such device is a cable 14 to the lower end of which may be secured a submerged load 15.

Figure 2:
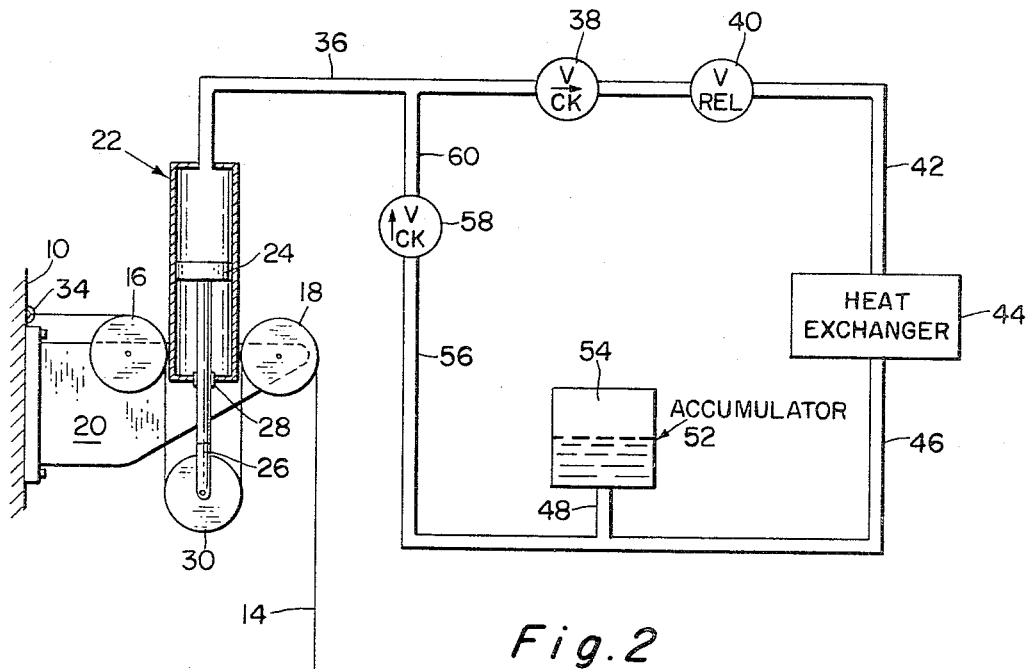
FIG. 2 is a schematic view of a preferred embodiment of this invention.

FIG. 2 shows diagrammatically the details of the invention depicted generally at 12 in FIG. 1 and includes two spaced sheaves 16–18 suitably supported on a bracket 20 affixed to the stern of the vessel 10. Between the two sheaves and supported in place by the same bracket 20 is a vertically oriented cylinder 22 within which reciprocates a piston 24 having a piston shaft 26 which reciprocates in a bearing 28. As shown the end of the shaft may be bifurcated to receive a sheave 30. The line or cable 14 to be kept taut may have one end fastened to the floating ship 10 at point 34 and the remainder is looped around sheaves 16, 30 and 18 in the manner illustrated and then descends into the ocean.

Cylinder 22 and associated hydraulic lines are kept filled with hydraulic fluid and upon the imposition of a downward strain on cable 14 sheave 30 is moved upwardly forcing up piston shaft 26 and piston 24. This applies pressure to the fluid above the piston and the force is transmitted through line 36 and one way check valve 38 to an adjustable pressure relief valve 40. At a preset pressure this valve allows hydraulic fluid to pass therethrough from whence it travels, through line 42, to a heat exchanger 44 at which point heat is dissipated from the fluid. The cooled fluid is then conducted through lines 46 and 48 to an accumulator 52 where it compresses a body of air 54. At this stage fluid conducted through line 56 is stopped at a second one way check valve 58 aided by the equal pressure on the opposite side thereof which exists in the return line 60.

When the tension on cable 14 is relieved the compressed body of air 54 overcomes the reduced pressure on the fluid and forces fluid from accumulator 52, through lines 48 and 56, past the second one way check valve 58 and, by way of lines 60 and 36, the fluid is returned to the upper portion of cylinder 22 to force down piston 24 and piston shaft 26 which carries with it sheave 30 thereby taking up the cable slack.

It will be noticed that with this system there is a constant response to the tension needs of the cable and furthermore that large amounts of energy may be dissipated in heat by the action of the relief valve and heat exchanger.

It will be apparent that this device is adapted for use wherever a strain relieving device is desired and is not limited in application to the marine environment shown.

Obviously many modifications and variations of the present invention are possible in the light of the above teachings. It is therefore to be understood that within the scope of the appended claims the invention may be practiced otherwise than as specifically described.

I claim:

1. Means for keeping a cable under a substantially uniform tension comprising:
    a tension responsive means having a portion movable in accordance with changes in cable tension;
    a sealed hydraulic system including a chamber in communication with said movable portion and containing hydraulic fluid;
    an accumulator to store hydraulic fluid under pressure;
    a first conduit communicating said chamber with said accumulator;
    said first conduit having a check valve therein to permit fluid to enter the accumulator and prevent fluid return to the chamber;
    said first conduit also having a pressure responsive control means therein to admit fluid to the accumulator when a predetermined chamber pressure is attained;
    a second conduit communicating said accumulator with said chamber;
    said second conduit having a check valve therein to permit fluid flow from the accumulator to the chamber but prevent fluid return to the accumulator;
    whereby upon increased cable tension fluid is stored under pressure in the accumulator and upon reduced cable tension the accumulator returns fluid to the chamber to maintain tension on the cable.

2. A device according to claim 1 wherein the system includes a heat dissipating means in the first conduit between the pressure responsive control means and the accumulator.

3. A device according to claim 1 wherein the pressure relief means is adjustable.

4. A device according to claim 1 wherein the fluid is a liquid.

5. A device according to claim 1 wherein the tension responsive means includes a piston movable in a cylinder.

6. A device according to claim 1 wherein the fluid pressure system includes a check valve normally isolating the accumulator from the tension responsive means.

7. A device according to claim 6 wherein a second check valve normally isolates the tension responsive means from the pressure relief means.

References Cited by the Examiner
UNITED STATES PATENTS

| | | | |
|---|---|---|---|
| 3,150,860 | 9/1964 | Nelson | 254—172 |
| 3,208,728 | 9/1965 | Darks | 254—172 |
| 3,222,866 | 12/1965 | Lehmann | 60—52 |

EVON C. BLUNK, *Primary Examiner.*

SAMUEL F. COLEMAN, *Examiner.*

H. C. HORNSBY, *Assistant Examiner.*